United States Patent [19]
Shu et al.

[11] Patent Number: 5,928,350
[45] Date of Patent: Jul. 27, 1999

[54] WIDE MEMORY ARCHITECTURE VECTOR PROCESSOR USING NXP BITS WIDE MEMORY BUS FOR TRANSFERRING P N-BIT VECTOR OPERANDS IN ONE CYCLE

[75] Inventors: David B. Shu, West Hills; David A. Schwartz, Moorpark; Lap-Wai Chow, So. Pasadena, all of Calif.

[73] Assignee: Raytheon Company, Lexington, Mass.

[21] Appl. No.: 08/840,178

[22] Filed: Apr. 11, 1997

[51] Int. Cl.$^6$ ...................................................... G06F 9/312
[52] U.S. Cl. ................................................................ 712/4
[58] Field of Search ........................... 395/886, 800.02, 395/800.04, 800.08, 563

[56] References Cited

U.S. PATENT DOCUMENTS 5,251,173  10/1993  Wong ................................. 365/189.11

OTHER PUBLICATIONS

Hodges, David A., Jackson, Horace G., Analysis and Design of Digital Integrated Circuits, $2^{nd}$ ed, McGraw–Hill, 1988, pp. 74, 242, 301, 367.

Primary Examiner—Richard L. Ellis
Attorney, Agent, or Firm—Leonard A. Alkov; Glenn H. Lenzen, Jr.

[57] ABSTRACT

A wide memory architecture is provided for storing data associated with a vector processor. Additionally, a method for accessing a wide memory architecture is provided. The wide memory architecture includes a memory for storing an array of vector operands. The memory is coupled to a data bus which provides an access pathway connecting the memory to a processor. The wide memory architecture further includes at least one staging buffer disposed between the memory and the processor. The staging buffer is capable of providing intermediate storage of a vector operand upon which a function can be performed by the processor.

20 Claims, 5 Drawing Sheets

WIDE MEMORY ARCHITECTURE VECTOR PROCESSOR USING NXP BITS WIDE MEMORY BUS FOR TRANSFERRING P N-BIT VECTOR OPERANDS IN ONE CYCLE

BACKGROUND OF THE INVENTION

1. Technical Field

This invention generally relates to a memory architecture. More particularly, the present invention relates to a wide memory architecture for highly parallel vector processing applications.

2. Discussion

High speed memory architectures using register files which are directly accessible by the functional units of the processor are generally known within the electronics art. Such high speed memory or register files are increasingly used in conjunction with Fast Fourier Transform (FFT) processors and vector processors, as well as other types of highly parallel processors. The large number of numerical calculations performed by these processors requires very fast memory architectures for storing the intermediate results of the calculations in order to achieve high processing throughput.

As the demand for more complex signal processors increases, so does the demand for wider memory architectures. For example, FFT processors and vector processors are typically based upon highly parallel computer architectures. This means that the conventional 32 and 64 bit data bus channels associated with current high performance microprocessors will be replaced with a data bus including from 500 to 4,000 data channels. Accordingly, the memory employed to support these highly parallel processors will also require a very wide data pathway. However, this increase in the number of data channels, or strip transmission lines formed on the silicon chip, consumes valuable area on the silicon chip, reduces the number of transistors that can be formed on the silicon, and thus reduces the density of the memory that can be realized on a single chip. Additionally, the increase in the number of data lines also increases the capacitive load placed on the data bus and memory circuit.

To overcome the problems created by the increase in the number of data lines, memory designers used conventional single port memory to minimize the impact of the additional data lines. However, as the throughput requirements of these highly parallel processors increased, the single data bus of single-ported memory architectures created a bottleneck to and from the processor. Thus, memory designers developed multi-ported memory architectures, which essentially provided more than one data bus or data pathway between the memory and the processor. These are also referred to as multi ported register files.

The conventional approach to functionally implementing multi-ported memory was to allow simultaneous multiple access (read and write) from and to the processor. More particularly, two or more separate execution units of a particular vector process were able to simultaneously read/write from two or more different memory locations via separate parallel data busses. Due to the increased number of data and address control lines, these multi-ported memories evolved into very complex circuit architectures to support the simultaneous multiple access capabilities. Additionally, the increase in the number of data channels to support two or more separate data busses served to lower the memory density, and increase the capacitive loads placed upon the circuit, as described above. Thus, while multi-ported memory architectures provided the necessary throughput for the processor, this performance was achieved at a higher design and manufacturing expense and resulted in lower density memory.

The conventional approach to designing a multi-port register file is based upon modifying the basic single-port register cell into a multi-ported cell by adding additional read and write ports (transistors). However, the multi-port memory architectures currently known within the art present several design efficiency problems. For example, the 1-bit multi-ported register cell layout cannot be effectively optimized because the ratio between the I/O connectors and the number of devices in the cell is too large. Further, the interface between the multi-port register file and the functional units of the processor wastes significant integrated chip space because of the large number of data channels and electrical crossovers. The increased number of data channels make it difficult to utilize the silicon under the data bus routing channels. Additionally, silicon area of a multi-ported register is roughly proportional to the number of ports it supports. The conventional approach to achieving a multi-port register file is not efficient when the number of ports exceeds a certain value, typically six or seven ports. Multi-ported register files become wire routing bound as the number of ports increases. Additionally, the extra wiring capacitance of routing over the memory cells slows the memory as the number of ports increases. The effects of these inefficiencies are magnified as the number of read and write ports provided to the multi-port memory increases.

As such, it would be desirable to provide a high throughput wide memory architecture or register file based upon a single-ported memory architecture, which reduces the number of data channels and allows a significantly higher chip element density, similar to that of standard SRAM. Additionally, it is desirable to provide a wide memory architecture that allows for an increased number of transistors, and thus storage cells, without increasing the power required to drive the circuit. Finally, it is desirable to provide a wide memory architecture with the performance characteristics of multi-ported memory which avoids the wire routing problems typical of multi-ported memory. Such a wide memory architecture would significantly reduce the cost of manufacturing highly parallel vector processors and the memory required by these processors.

SUMMARY OF THE INVENTION

Pursuant to the present invention, a unique wide memory computer architecture is disclosed which implements a wide single-ported memory for providing high speed processing memory.

The wide memory architecture of the present invention provides the same performance characteristics of a multi-ported register file, but with significant advantages in area requirements, speed and power, which is similar to that of a single-ported memory architecture. More specifically, this wide memory architecture provides the throughput of a multi-ported register file which can support highly parallel vector and FFT processors. By reducing the number of data channels typically associated with multi-ported register files, this single-ported wide memory architecture also provides a memory chip with significantly higher storage element density. However, this wide memory architecture avoids the problems of wire routing, low element density, and high capacitive loading typically associated with conventional multi-ported memory.

The benefits of the wide memory architecture are achieved through the implementation of staging buffers, and a transformation in the spacing and sequencing of the wide memory access process. Accordingly, the new wide memory architecture of the present invention offers two significant advantages. First, this wide memory architecture offers the density of standard single-ported SRAM, which is greater than that of conventional multi-port memory. Second, the staging buffers reside under the data bus routing channels, which increases the utilization of the integrated chip area under the electrical interconnects.

BRIEF DESCRIPTION OF THE DRAWINGS

Additional objects, advantages and features of the present invention will become apparent from the following description and appended claims, taken in conjunction with the accompanying drawings in which:

DETAILED DESCRIPTION OF THE PREFERRED EMBODIMENTS

Figure 1:
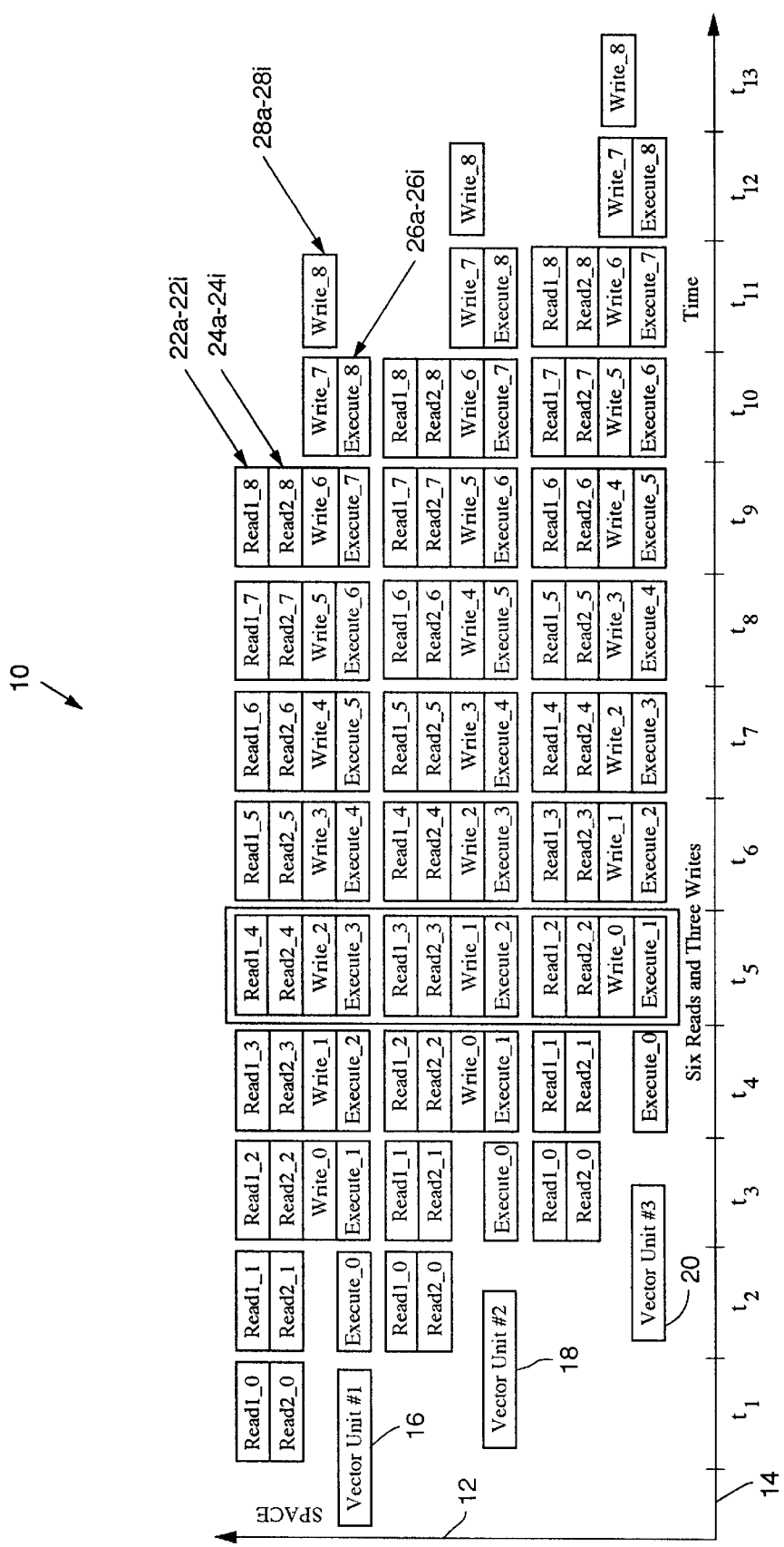
FIG. 1 is a graphical block diagram showing the space and time sequencing of the multi-ported memory access routine of a conventional vector processor having three vector units.

The following description of the preferred embodiments is merely exemplary in nature and is in no way intended to limit the invention, its applications or uses. Additionally, where appropriate in the detailed description like elements are identified with like reference numerals.

Through a unique restructuring of the integrating circuit layout, and memory access sequencing, a multi-ported memory architecture can be transformed into to a wide memory architecture by interweaving the features of a wide single-ported memory architecture and staging buffers. Throughout this application, the result of this integrated design will be referred to as a wide memory architecture. This wide memory architecture provides the full functionality of the multi-ported memory architecture, but with a reduced requirement for integrated circuit area and power consumption, similar to that of conventional single-ported memory, for example SRAM, while also increasing processing speed.

The simplified architecture of the wide single-ported memory serves to reduce the number of data lines, and thus allow for higher density memory. The staging buffers serve to hold the intermediate results produced by the various execution blocks associated with the vector units of a vector processor. As such, the staging buffers serve to maintain the high throughput of the memory by reducing the number of accesses to the wide memory, thus reducing bottlenecks. More specifically, this means that all of the needed intermediate data is stored in the staging buffers until all of the vector processor's execution blocks have completed their functions. Once these functions are completed for a particular vector unit, the data is written from the staging buffers back to the wide memory. For purposes of this application, a vector processor refers to a processor where a computer function is applied element-wise to a set of vector operands.

Referring now to FIG. 1, a graphical block diagram which depicts the relational layout and sequencing of the register operations of a conventional multi-ported memory register, associated with an exemplary vector processor, is shown. FIG. 1 further illustrates the relationship between space and time of the conventional multi-ported memory architecture. Accordingly, vertical axis 12 represents the space relationships between the various operation blocks, and horizontal axis 14 represents the sequence and timing relationship between the various operational blocks. The exemplary vector processor 10 is shown having three independent vector units 16, 18, 20. The actual functions, such as multiplication or accumulating, performed by these vector units 16, 18, 20 shown in FIG. 1 is independent of the following discussion. While the operation of only one of the three vector units will be discussed in detail, one skilled in the art will appreciate that the operation of the three vector units 16, 18, 20 forming vector processor 10 is essentially identical.

With continued reference to FIG. 1, first vector unit 16 is shown with four rows of nine operation blocks. More specifically, vector unit 16 includes a first row of nine read operation blocks 22a–22i which read the first operand from a multi-ported memory register (not shown), and a second row of nine read operation blocks 24a–24i which read the second operand from the multi-ported memory register. First vector unit 16 also includes nine instruction execution blocks 26a–26i which perform some type of predetermined function on its associated first and second operands. The intermediate results of the functions performed by instruction execution blocks 26a–26i are written back to the multi-ported memory register by nine write operation blocks 28a–28i.

Figure 2:
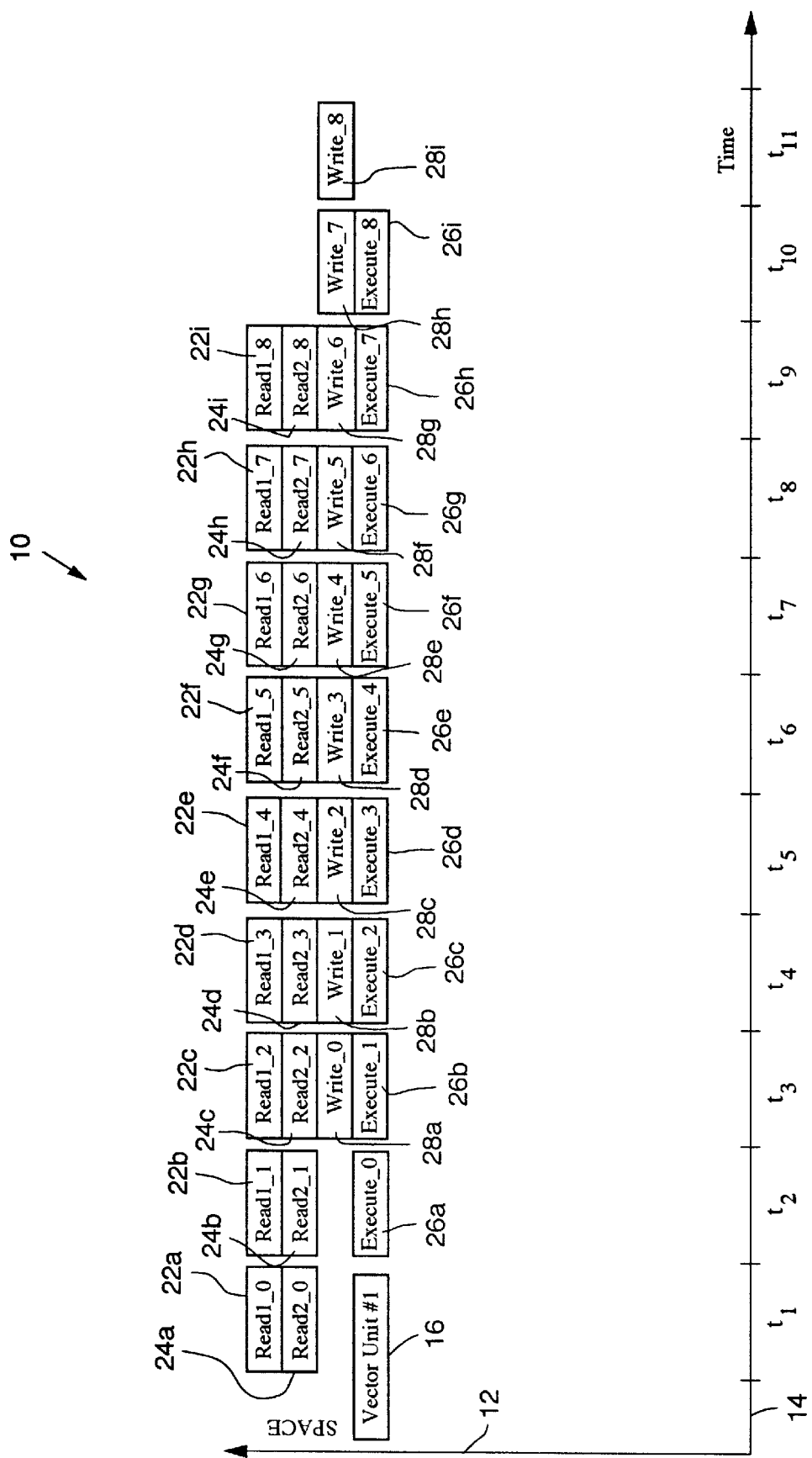
FIG. 2 is a graphical block diagram showing the space and time sequencing of the multi-ported memory access routine of one vector unit of a conventional vector processor.

Referring now to FIG. 2, first vector unit 16 is shown by itself to simplify the following functional overview. Vector processor 10 operates according to the following general description. During clock cycle $t_1$ read operation blocks 22a and 22a each simultaneously read an operand from the multi-ported memory register via separate data busses. During clock cycle $t_2$, read operation blocks 22b and 24b then each simultaneously read an operand from memory in a similar fashion. Also during clock cycle $t_2$, instruction execution block 26a performs its function on the two operands provided to it from memory by read operation blocks 22a and 22a. During clock cycle $t_3$, in addition to the read operations performed by read blocks 22c and 24c, and the function performed by the second execution block 26b, the first "write" to memory of an intermediate result, produced by execution block 26a, is performed by write operation block 28a. These operations continue through clock cycle to, when instruction execution block 26i (execute_8) performs its function on the last two operands received from read operation blocks 22i and 24i. Finally, the result from execution block 26i will be written back to memory by write operation block 28i during clock cycle $t_{11}$. Thus, it becomes apparent from FIG. 2 and this general example that one complete vector element operation involves two read operations, one execution operation, and one write operation. FIG. 2 further illustrates nine complete vector element operations associated with first vector unit 16. It will also become apparent to one skilled in the art that the nine vector element operations can be repeated as many times as necessary to perform the desired vector process.

Assuming that the memory which is dedicated to supporting first vector unit 16 is a multi-ported memory, this memory would require three separate data busses (or ports) coupling the memory to vector unit 16 of the vector processor 10. The first data port coupled to memory would be dedicated to the first read operation blocks 22a–22i. The second data port would be dedicated to the second read operation blocks 24a–24i. Finally, the third data port would be dedicated to the write operation blocks 28a–28i. Thus, it becomes apparent that according to the conventional vector processor space and time layout depicted in FIGS. 1 and 2, vector unit 16 requires a multi-ported memory with three separate data busses. As such, a vector processor 10, having three independent vector units 16, 18 and 20, will require a multi-ported memory with nine separate data busses to provide the required data throughput to vector processor 10. It should also be noted the number of ports, 9, is derived from the total number of read and write operations, 6 reads, 3 writes, performed during peak processing time by the read and write operation blocks. This number is not dependent upon the total number of sequential read, execute and write operation blocks depicted in the rows of operation blocks.

Figure 3:
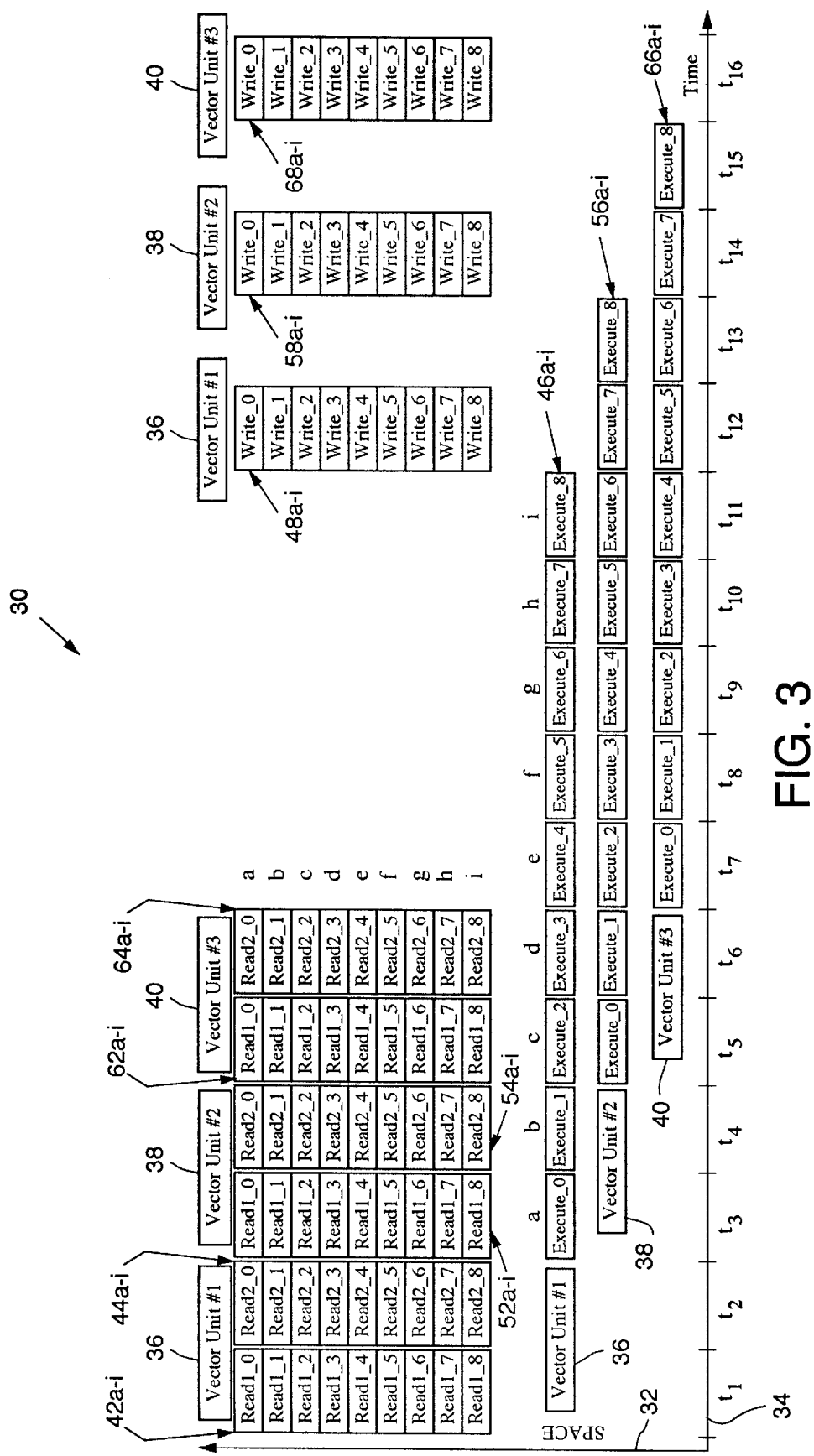
FIG. 3 is a graphical block diagram showing the space and time sequencing of the single-ported memory and staging buffer access technique of a vector processor according to a preferred embodiment of the present invention.
Figure 4:
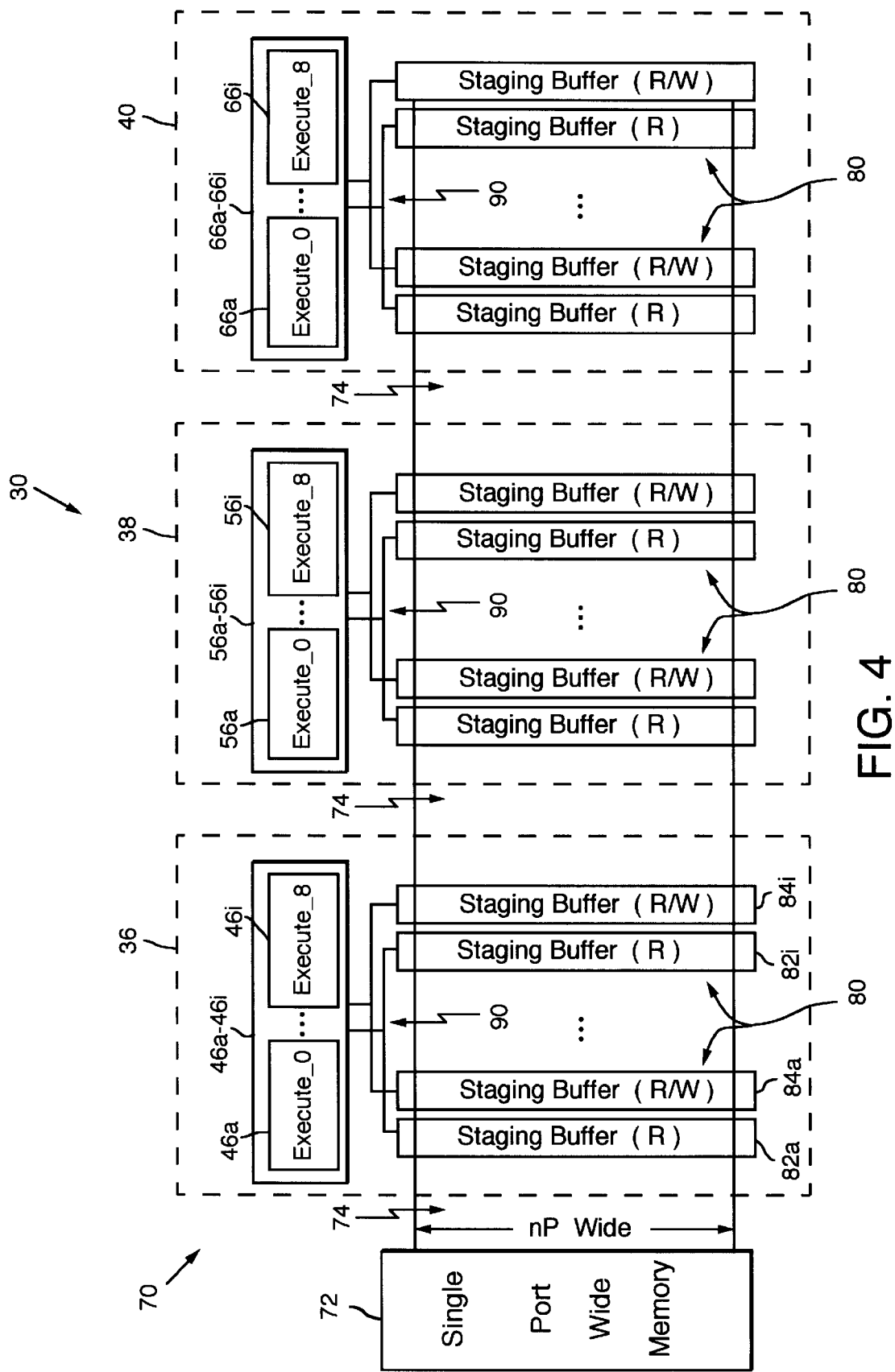
FIG. 4 is a block diagram depicting the staging buffers connected to the single-ported wide memory architecture in accordance with a preferred embodiment of the present invention.

With reference to FIGS. 3 and 4, a vector processor 30 having three vector units for use with the wide memory architecture 70 of the present invention is shown. FIG. 3 illustrates the reorganization in space and time of the read operation, execute operation and write operation blocks associated with each vector unit. Vertical axis 32 represents the space relationships between the various operation blocks, and horizontal axis 34 represents the sequence and timing relationship between the various operational blocks. Additionally, vector processor 30 includes first vector unit 36, second vector unit 38 and third vector unit 40. Through a unique reorganization scheme, and the use of the staging buffers 80 (FIG. 4), the single ported wide memory architecture 70 of the present invention can support vector processor 30 with sufficient information transfer through a single wide data bus 74. It should also be noted that the number of vector units associated with the present invention is typically optimized to the specialized processing requirements of the associated processing algorithm. An exemplary application of a such a memory register is that used in conjunction with a FFT processor for high definition imaging and signal processing.

As with the conventional vector processor, first vector unit 36 also requires two read operations, one execute operation and one write operation to complete one vector element operation. More particularly, first vector unit 36 includes a first column of nine read operation blocks 42a–42i which read the first operand from the wide memory 72, and a second column of nine read operation blocks 44a–44i which read the second operand from the wide memory 72. Vector unit 36 also includes a row of nine instruction execution blocks 46a–46i, each block performing a predetermined function on its associated first and second operands. The intermediate results of the functions performed by instruction execution blocks 46a–46i are written back to the wide memory 72 during one clock cycle by the column of nine write operation blocks 48a–48i via wide data bus 74.

The reorganization of the read operation, execute operation and write operation blocks illustrated in FIG. 3 allow the transfer of information between the wide memory architecture 70 and the vector processor 30 to be significantly streamlined. By reorganizing the manner in which information is stored in the wide memory 72, a single, wide data bus 74 can be employed. In the memory architecture of the present invention, one long vector or line of memory will be formed by a row of nine vector operands. This organizational scheme is analogous to a conventional 32 bit memory word which is subdivided into four bytes of information. Thus, the nine vector operands are transferred between the memory 72 and vector processor 30 as one long vector unit across a single wide data bus 74 connected to a single port of the wide memory 72.

The reorganized vector processor 30 associated with the wide memory architecture 70 of the present invention operates according to the following description. During clock cycle $t_1$, first read operation blocks 42a–42i simultaneously read one long vector from the wide memory 72 which includes nine individual vector operands. A block of staging buffers 82a–82i are associated with each of the nine individual vector operands retrieved by each read operation block 42a–42i. Accordingly, the nine vector operands are temporarily stored in the nine individual staging buffers 82a–82i. likewise, during clock cycle $t_2$, second read operation blocks 44a–44i also simultaneously read one long vector from the wide memory 72. These nine individual vector operands are also placed within their associated nine staging buffers 84a–84i. During clock cycle $t_3$, the read operation blocks 52a–52i associated with second vector unit 38 also perform a similar read operation and store the individual nine vector operands into staging buffers 80. The read operations associated with first, second and third vector units 36, 38, 40 continue through clock cycle $t_6$. Also during clock cycle $t_3$ execution block 46a performs its function on the two operands stored in read staging buffer 82a and read/write staging buffer 82a associated with read operation blocks 42a and 44a. After performing its function, instruction execution block 46a places its intermediate result operand back into read/write staging buffer 84a for temporary storage. Likewise, during clock cycle $t_4$, execution block 46b performs its function on the two operands stored in the associated staging buffers 80 by read operation blocks 42b and 44b. During clock cycle $t_5$, execution block 56a performs its function on the two operands stored in staging buffers 80 by read operation blocks 52a and 52a of second vector unit 38.

As will become apparent from FIG. 3, the instruction execution block 56a associated with second vector unit 38 does not begin to perform its function on its associated operands stored in staging buffers 80 by read operation blocks 52a and 54a until clock cycle $t_5$. Accordingly, the present invention achieves its efficiencies and high data throughput by preloading the staging buffers 80 associated with a particular vector unit with nine first operands and nine second operands prior to beginning the sequence of nine instruction execution operation blocks. Also according to this processing technique, the write operation blocks 48a–48i associated with first vector unit 36 do not begin to write the intermediate result from the read/write staging buffers 84a–84i back to the wide memory 72, until clock cycle $t_{12}$. The write operation blocks 48a–48i simultaneously write one long vector, comprising nine individual vector operands, back to the wide memory 72 via a single wide data bus 74 during clock cycle $t_{12}$. Accordingly, the write operation blocks 58a–58i associated with second vector unit 38 will write the intermediate vector operands from their associated read/write staging buffers 80 during clock cycle $t_{14}$ after all of the execution blocks 56a–56i have performed their functions on the nine individual pairs of vector operands (clock cycle t__). Finally, the write operation blocks 68a–68i associated with third vector unit 40 will write their intermediate vector operand results from their associated read/write staging buffers 80 back to the wide memory 72 during clock cycle $t_{16}$, after all of the execution blocks 66a–66i associated with third vector unit 40 have completed their functions during clock cycle $t_{15}$.

From the above description, one skilled in the art will readily appreciate that the integration of staging buffers 80 with a wide single ported memory architecture 70 achieves the necessary data throughput without the additional data line complexity associated with conventional multi-ported memory architectures. By reorganizing the individual vector operands into one long vector unit, and performing a single read or write operation on this long vector unit from/to memory 72 during a particular clock cycle, a single wide data bus 74 can be used to transport this long vector unit, and thus, the individual nine vector operands, between the wide memory 72 and the vector processor 30. The staging buffers 80, described in more detail below, are utilized to eliminate the intermediate transfers of information along the data bus 74.

FIG. 4 illustrates the data path interconnections of the wide memory architecture 70 occurring between wide memory 72 and vector units 36, 38 and 40. The staging buffers 80 hold the individual vector operands and provide element-wise access to/from execution blocks of the the vector units. The staging buffers 80 are physically placed as close as possible to the associated vector unit instruction execution blocks. For high throughput designs, it is necessary to stage, or pipeline, the data accesses so as to eliminate the delay of the long interconnect data channels of data bus 74 from the wide memory 72 to the instruction execution blocks 46a–46i, 56a–56i and 66a–66i through standard pipelining techniques.

While the addition of staging buffers 80 creates overhead for the integrated circuit, this overhead is fixed, and is also independent of the size of the wide memory 72. Thus, if very high circuit integration techniques are utilized, the density of the single port wide memory architecture 70 can be significantly increased, thereby gaining maximum efficiencies with only a low amount of fixed overhead. Accordingly, the high transistor density provided by the single-ported, wide memory architecture 70 provides significant advantages over the prior art, because a significantly larger memory can be incorporated into a smaller area on the integrated circuit chip.

Figure 5:
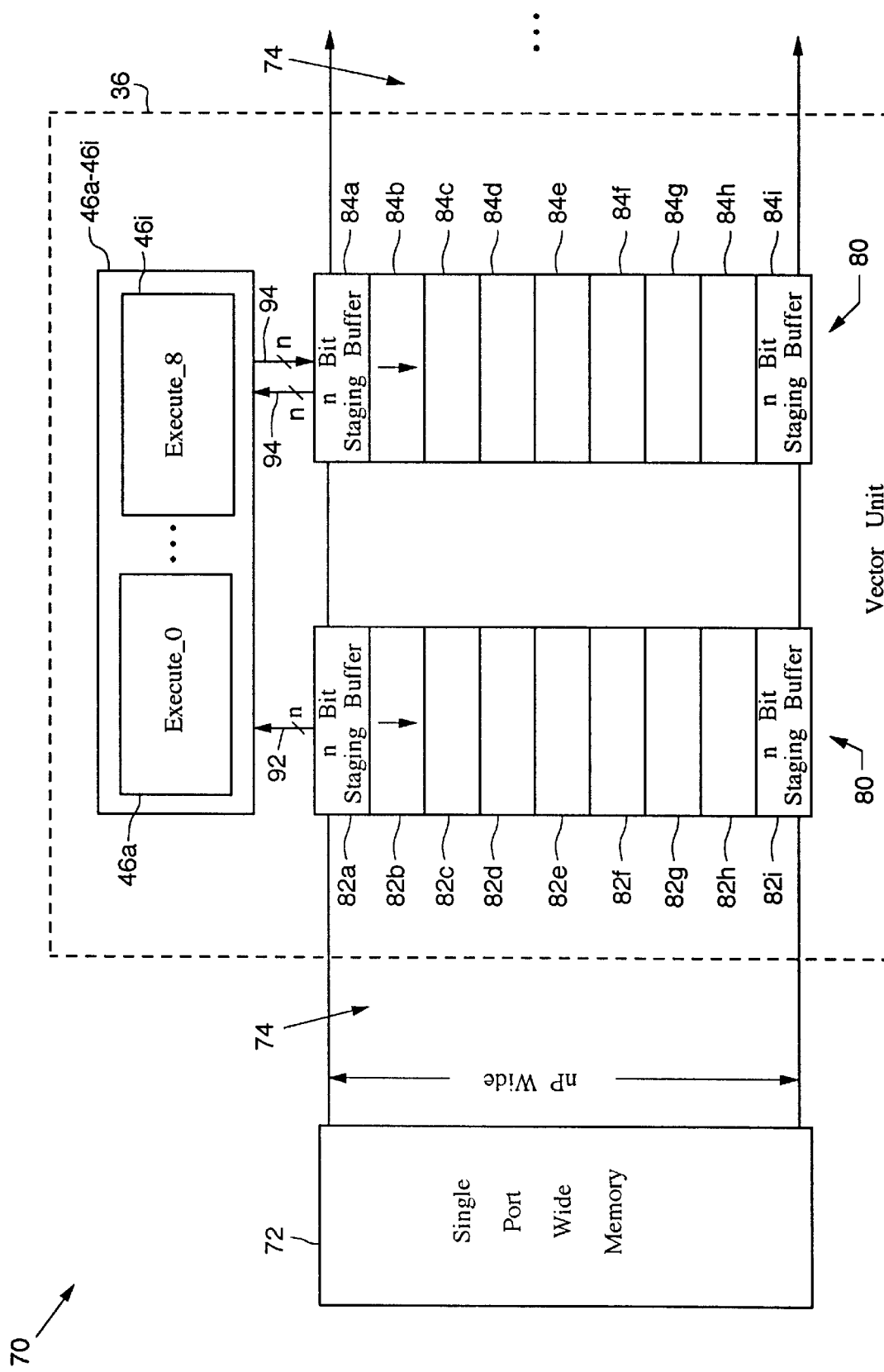
FIG. 5 is a block diagram depicting the staging buffers associated with one vector unit connected to the single-ported wide memory architecture also in accordance with the present invention.

Referring now to FIGS. 4 and 5, wide memory architecture 70 is illustrated as connected to first, second, and third vector units 36, 38 and 40 of vector processor 30 via wide data bus 74. For illustrative purposes, the operation of staging buffers 80 associated with first vector unit 36 will be described in more detail. However, it should be understood that the staging buffers 80 of vector units 38 and 40 operate in a similar fashion. FIG. 5 further illustrates the details of the staging buffers 80 and their interconnection with vector unit 36 of wide memory architecture 70. More particularly, first vector unit 36 is represented by execution blocks 46a–46i. Each execution block 46a–46i has two dedicated staging buffers, a read staging buffer 82a–82i and a read/write staging buffer 84a–84i, each capable of storing one vector operand P, having n data bits. The various instruction execution blocks of each vector unit communicate with the staging buffers 80 via data lines 90. As disclosed, vector unit 36 has nine execution blocks 46a–46i, and thus requires eighteen (18) dedicated staging buffers. A staging buffer design particularly suited for use with the wide memory architecture 70 of the present invention is that disclosed in U.S. application Ser. No. 08/827,856 PD-96004, filed Apr. 11, 1987, and entitled "Split Sense Amplifier And Staging Buffer For Wide Memory Architecture," commonly owned by the Assignee of the present invention, the disclosure of which is expressly incorporated herein by reference.

With particular reference to FIG. 5, staging buffers 82a–82i are designated as read-only buffers, and staging buffers 84a–84i are designated as read/write buffers. Staging buffers 82a–82i communicate with their associated instruction execution blocks 46a–46i via read data bus 92 and staging buffers 84a–84i communicate with their associated instruction execution block 46a–46i via read/write data bus 94. In operation, first read operation blocks 42a–42i read a long vector from wide memory 72 and place the nine individual vector operands in staging buffers 82a–82i, more specifically, staging buffer 82a stores the first vector operand of the long vector, staging buffer 82b stores the second vector operand, and staging buffer 82i stores the ninth vector operand of the long vector. Likewise, second read operation blocks 44a–44i read a long vector from wide memory 72 and place the nine individual vector operands in staging buffers 84a–84i. As described above, each execution block 46a–46i performs its predetermined function on the pair of vector operands associated therewith in pipelined fashion. More specifically, execution block 46a receives a pair of vector operands from staging buffers 82a and 84a via data bus 92 and data bus 94 respectively. Execution block 46a performs its function which produces a single resulting vector operand, referred to as an intermediate result. This intermediate result is then transferred back into read/write staging buffer 84a via data bus 94 for temporary storage. After all nine instruction execution blocks 46a–46i have performed their instructions and placed their intermediate results into read/write staging buffers 84a–84i, the write operation blocks 48a–48 i write the nine individual resulting vector operands (nine intermediate results) as one long vector back to wide memory 72 via wide data bus 74.

The design of the present invention is based upon long vectors of P individual vector operands, having n data bits. Thus, for purposes of this example, if each vector operand includes 32 bits (n=32), then each staging buffer, such as staging buffer 82a, is likewise capable of storing 32 bits. If the long vector includes nine individual vector operands (P=9), of 32 bits, then a long vector unit will have a total of 288 bits. Accordingly, each staging buffer block 80 is capable of storing 288 bits (n×P). Further, each addressable line of memory in wide memory 72 will have 288 storage cells, one per bit, and wide data bus 74 will have 288 individual data lines (n×P) for transporting a long vector to and from wide memory 72. Accordingly, from the preceding detailed description and examples, one skilled in the art will readily recognize that the teachings of the present invention allow a highly parallel vector processor to be supported by a high throughput single-ported wide memory architecture.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A wide memory architecture comprising:

a memory for storing an array of vector operands;

a data bus connected to the memory, the data bus providing an access pathway connecting the memory to a processor, the data bus including a plurality of routing channels between the memory and the processor; and at least one staging buffer connected to the data bus between the memory and the processor, the staging buffer storing P vector operands where each vector operand includes n data bits, and the data bus including n×P routing channels;

the staging buffer providing intermediate storage of the vector operands upon which a function can be performed by the processor, and wherein n×P data bits are transferred from the memory and stored in the staging buffer in one time period such that P vector operands are available to the processor.

2. The wide memory architecture of claim 1 wherein the memory includes a single port connected to the data bus for data access.

3. The wide memory architecture of claim 1 wherein the staging buffer is disposed under the routing channels of the data bus.

4. The wide memory architecture of claim 1 wherein the memory further comprises an array of storage units, and wherein one line of said array of storage units provides storage for n×P bits of data.

5. The wide memory architecture of claim 1 wherein the processor includes a plurality of execution units, each of said execution units having two staging buffers dedicated thereto, the staging buffers being connected between the memory and the execution units.

6. The wide memory architecture of claim 5 wherein the two staging buffers further comprise a first read staging buffer and a second read/write staging buffer.

7. The wide memory architecture of claim 1 wherein the processor is a vector processor.

8. The wide memory architecture of claim 7 wherein the processor further comprises at least one vector unit, the vector unit including a plurality of vector operations, each of said vector operations having at least two read operations, one execute operation and one write operation.

9. The wide memory architecture of claim 1 wherein the memory is a static random access memory.

10. A wide memory architecture comprising:

a single ported memory for storing an array of vector operands;

a vector processor having a plurality of execution units, each of the execution units having two staging buffers dedicated thereto, and wherein the two staging buffers further comprise a first read staging buffer for storing P vector operands and a second read/write staging buffer for storing P vector operands, each vector operand having n data bits, the staging buffers being connected between the memory and the execution units; and a data bus for connecting the memory to the vector processor, the data bus having n×P data lines connecting between the memory and the staging buffers;

whereby each staging buffer provides intermediate storage of the vector operands upon which a function can be performed by the vector processor, and wherein n×P data bits are transferred from the memory to the first staging buffer during a first time period and n×P data bits are transferred from the memory to the second staging buffer during a second consecutive time period.

11. The wide memory architecture of claim 10 wherein the execution units begin performing the function on the vector operands during a third consecutive time period.

12. The wide memory architecture of claim 10 wherein the memory further comprises an array of storage units, and wherein one line of said array of storage units provides storage for n×P bits of data.

13. The wide memory architecture of claim 10 wherein the vector processor further comprises at least one vector unit, the vector unit including a plurality of vector operations, each of said vector operations having at least two read operations, one execute operation and one write operation.

14. The wide memory architecture of claim 10 wherein the memory is a static random access memory.

15. A method for processing vector operands in a wide memory architecture comprising the steps of:

providing a memory for storing an array of vector operands;

providing a processor for performing functions on the array of vector operands;

providing a data bus for connecting the memory to the processor, said data bus formed by a plurality of routing channels;

providing at least one staging buffer disposed between the memory and the processor and under the routing channels of the data bus, the staging buffer storing P vector operands, each vector operand including n data bits, and the data bus including n×P routing channels;

transporting P vector operands from the memory to the staging buffer during a first time period for intermediate storage;

transporting at least one of said P vector operands to the processor;

performing a function within the processor on the vector operand for producing a resulting operand;

transporting the resulting operand from the processor to the staging buffer for intermediate storage; and transporting an array of resulting vector operands from the staging buffer to the memory.

16. The method of claim 15 wherein the processor includes a plurality of execution units, each of said execution units having two staging buffers dedicated thereto, the staging buffers being connected between the memory and the execution units.

17. The method of claim 16 wherein the two staging buffers further comprise a first read staging buffer and a second read/write staging buffer.

18. The method of claim 15 wherein the memory includes a single port for data access.

19. The method of claim 15 wherein the memory provides an array of storage units, and wherein one line of said array of storage units provides storage for n×P bits of data.

20. The method of claim 15 wherein the processor is a vector processor.

* * * * *